United States Patent
Martel et al.

(10) Patent No.: US 10,032,041 B2
(45) Date of Patent: Jul. 24, 2018

(54) STORAGE VOLUME PROTECTION USING RESTRICTED RESOURCE CLASSES

(71) Applicant: Apple Inc., Cupertino, CA (US)

(72) Inventors: Pierre-Olivier Martel, Mountain View, CA (US); Austin G. Jennings, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/874,224

(22) Filed: Oct. 2, 2015

(65) Prior Publication Data

US 2016/0357983 A1    Dec. 8, 2016

Related U.S. Application Data

(60) Provisional application No. 62/171,849, filed on Jun. 5, 2015.

(51) Int. Cl.
| | |
|---|---|
| *G06F 7/04* | (2006.01) |
| *G06F 11/00* | (2006.01) |
| *H04L 29/06* | (2006.01) |
| *H04L 9/32* | (2006.01) |
| *G06F 12/14* | (2006.01) |
| *G06F 21/62* | (2013.01) |
| *G06F 9/54* | (2006.01) |

(52) U.S. Cl.
CPC .......... *G06F 21/6218* (2013.01); *G06F 9/545* (2013.01)

(58) Field of Classification Search
CPC .............................. G06F 21/6218; G06F 9/545
USPC ....... 726/27, 30, 34; 713/165, 166, 168, 189
See application file for complete search history.

(56) References Cited

U.S. PATENT DOCUMENTS

| | | |
|---|---|---|
| 7,380,140 B1 | 5/2008 | Weissman et al. |
| 7,552,467 B2 | 6/2009 | Lindsay |
| 7,657,553 B2 | 2/2010 | Cohen et al. |
| 7,945,669 B2 | 5/2011 | Bober et al. |
| 8,146,138 B2 | 3/2012 | Chen et al. |
| 8,332,613 B1 | 12/2012 | Glade et al. |
| 8,707,303 B2* | 4/2014 | Harrison ................. G06F 21/53 718/1 |
| 2002/0116542 A1 | 8/2002 | Tarbotton et al. |
| 2005/0289353 A1 | 12/2005 | Dahlke |
| 2006/0212407 A1 | 9/2006 | Lyon |
| 2007/0143624 A1 | 6/2007 | Steeves |
| 2007/0204274 A1* | 8/2007 | Drepper ................. G06F 9/546 719/313 |
| 2007/0208882 A1* | 9/2007 | Corrigan ................. G06F 9/544 710/3 |
| 2008/0065882 A1* | 3/2008 | Goodman ........... G06F 21/6218 713/165 |
| 2008/0120499 A1 | 5/2008 | Zimmer et al. |
| 2008/0252493 A1 | 10/2008 | Cho et al. |

(Continued)

*Primary Examiner* — Aravind K Moorthy
(74) *Attorney, Agent, or Firm* — Womble Bond Dickinson (US) LLP

(57) ABSTRACT

Techniques for restricting access to a storage volume attached to a data processing system are described. In one embodiment, a storage management and access control logic in the data processing system can receive a message indicating the attachment of a storage volume. The logic can apply access restrictions to the storage volume by creating an association between a restricted resource class and the storage volume to limit programmatic access to the storage volume. An evaluation of the storage volume can be requested and based on the result of the evaluation the access restrictions can be removed or retained on the storage volume.

32 Claims, 10 Drawing Sheets

(56) References Cited

U.S. PATENT DOCUMENTS

| | | | |
|---|---|---|---|
| 2010/0070732 A1* | 3/2010 | Strutt | G06F 3/0605 711/170 |
| 2011/0023110 A1 | 1/2011 | Freund et al. | |
| 2011/0252242 A1* | 10/2011 | Ureche | G06F 21/6218 713/189 |
| 2011/0292031 A1 | 12/2011 | Zhu et al. | |
| 2011/0302330 A1* | 12/2011 | Cota-Robles | G06F 9/468 710/14 |
| 2012/0124641 A1* | 5/2012 | Hegge | G06F 21/554 726/1 |
| 2012/0254982 A1* | 10/2012 | Sallam | G06F 21/564 726/16 |
| 2012/0304313 A1* | 11/2012 | Mao | H04L 67/104 726/29 |
| 2013/0246354 A1* | 9/2013 | Clayton | G06F 11/2071 707/624 |
| 2013/0333040 A1* | 12/2013 | Diehl | G06F 9/46 726/24 |
| 2014/0006853 A1* | 1/2014 | Dudgeon | G06F 11/1435 714/15 |
| 2014/0244901 A1* | 8/2014 | Panda | G06F 12/0246 711/103 |
| 2015/0227595 A1* | 8/2015 | Sadovsky | G06F 17/30371 707/602 |
| 2015/0281284 A1* | 10/2015 | Cho | G06F 21/6281 726/1 |
| 2015/0347741 A1 | 12/2015 | Krstic et al. | |
| 2015/0363274 A1* | 12/2015 | Nanivadekar | G06F 11/1448 707/654 |
| 2015/0381727 A1* | 12/2015 | Muhlestein | H04L 67/1097 709/214 |
| 2016/0147675 A1* | 5/2016 | Lin | G06F 21/44 711/164 |
| 2017/0039383 A1* | 2/2017 | Woo | G06F 21/60 |

* cited by examiner

STORAGE VOLUME PROTECTION USING RESTRICTED RESOURCE CLASSES

CROSS-REFERENCE

Applicant claims priority to provisional application Ser. No. 62/171,849, filed Jun. 5, 2015, the entirety of which is incorporated by reference. This application is also related to co-pending non-provisional application Ser. No. 14/292,705, filed May 30, 2015, the entirety of which is incorporated by reference.

FIELD OF THE INVENTION

Embodiments of the present invention relate generally to an operating system of a data processing system. More particularly, embodiments relate to the protection of storage volumes of an operating system.

BACKGROUND OF THE DISCLOSURE

In a conventional operating system, once malware (e.g., "viruses," "worms," "Trojan horses," "spyware," "adware," etc.) gains certain access privileges, such as root or administrative privilege, the malware can cause significant damage to software or hardware within the system. Particularly, the malware can modify certain security settings of system components or applications running within an operating system, which in turn defeat most or all of the security measures present within the system. The security concerns caused by malware impact nearly all types of processor-based electronic devices and are a particular concern for computing devices, including server or workstation computing devices; laptop and mobile computing devices; tablet computing devices; cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, most of these techniques are ineffective if the malware gains access to administrative privileges for the operating system.

SUMMARY OF THE DESCRIPTION

Various embodiments are described to enhance the protections applied to certain resources of a data processing system from malicious access by malware. In the description provided herein, reference to "one embodiment" or "an embodiment" indicates that a particular feature, structure, or characteristic described in conjunction with the embodiment can be included in at least one embodiment of the invention. The appearances of the phrase "in one embodiment" in various places in the specification do not necessarily all refer to the same embodiment. Additionally, details described in conjunction with an embodiment may be applied to other embodiments described herein.

One embodiment provides for a method of storage volume protection using a restricted resource class, the method comprising receiving a message indicating attachment of a storage volume; creating an association between a restricted resource class and the storage volume to limit programmatic access to the storage volume; requesting an evaluation of the storage volume; receiving a result of the evaluation of the storage volume; and removing or maintaining the association based on the result.

One embodiment provides for a non-transitory machine-readable medium storing instructions which, when executed by one or more processors, cause the one or more processors to perform operations comprising receiving a message indicating attachment of a storage volume; creating an association between a restricted resource class and the storage volume to limit programmatic access to the storage volume; requesting an evaluation of the of the storage volume; receiving a result of the evaluation of the storage volume; and removing or maintaining the association based on the result.

One embodiment provides for a data processing system, comprising one or more processors coupled to memory, the one or more processors to execute a plurality of processes comprising a kernel mode process to receive a message indicating attachment of a storage volume and create an association between a restricted resource class and the storage volume to limit programmatic access to the storage volume and a user mode process to perform an evaluation of the storage volume upon request from the kernel mode process, the evaluation to determine based on characteristics of the storage volume, where the kernel mode process is to maintain the association between the restricted resource class and the storage volume.

One embodiment provides for a method of storage volume protection using a restricted resource class, the method comprising receiving a message indicating attachment of a storage volume; requesting an evaluation of the of the storage volume; receiving a result of the evaluation of the storage volume; and based on the result of the evaluation, creating an association between a restricted resource class and the storage volume to limit programmatic access to the storage volume.

Other methods and apparatuses are also described.

BRIEF DESCRIPTION OF THE DRAWINGS

Embodiments of the present invention are illustrated by way of example, and not limitation, in the figures of the accompanying drawings in which like references indicate similar elements.

DETAILED DESCRIPTION

Figure 1:
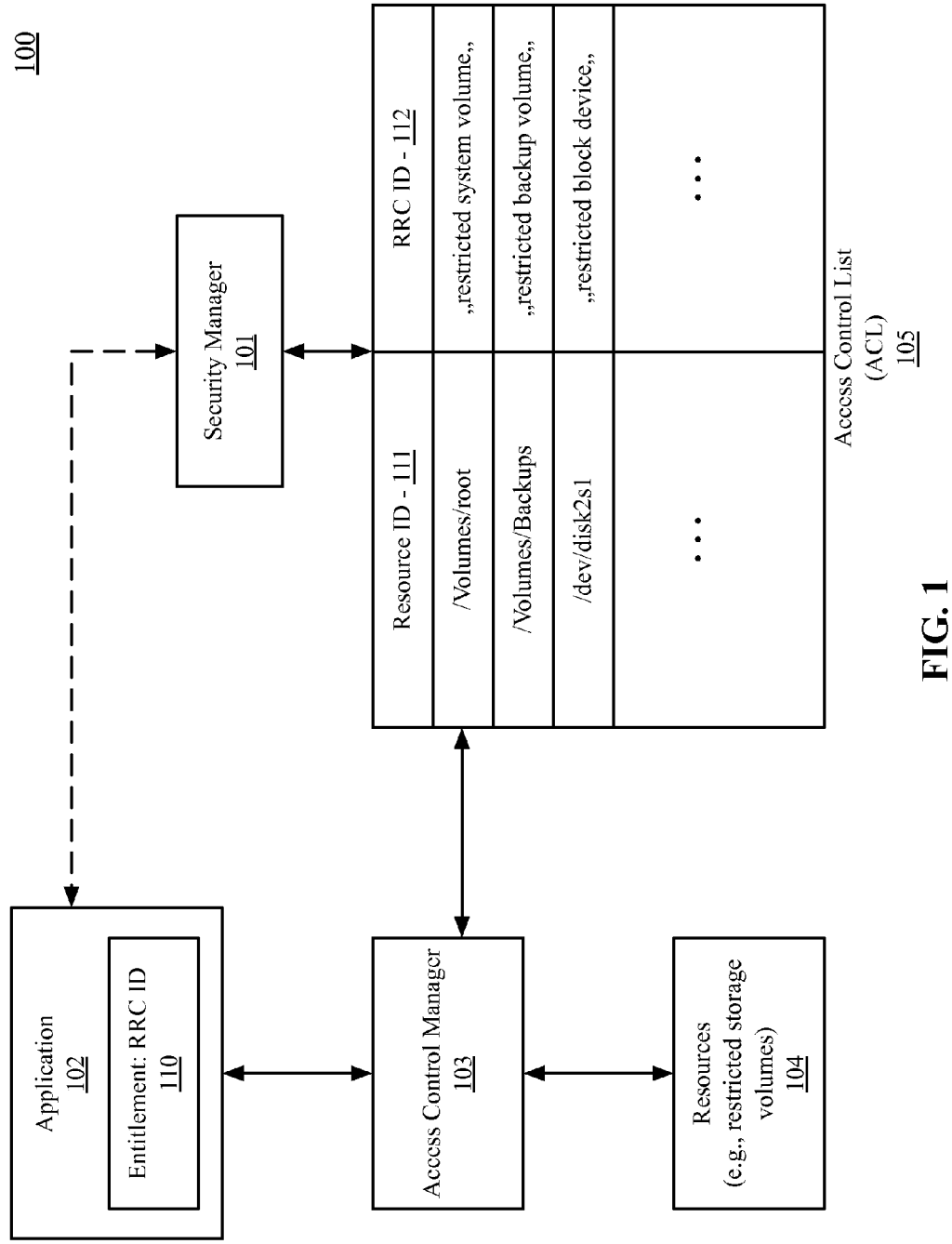
FIG. 1 is a block diagram illustrating an exemplary access control system of an operating system, according to an embodiment.

In embodiments described herein, an additional layer of protection is applied to certain resources of a data processing system to protect those systems from malicious access by malware. In one embodiment, protected resources are categorized into different restricted resource classes (RRCs). A resource associated with a particular RRC can only be accessed by a software program that belongs to that particular RRC and authorized as a part of RRC entitlements by a proper authority. In one embodiment, the RRC entitlements may be authorized, signed, and encoded within an executable image of a software program, such that the RRC entitlements are securely protected.

In some embodiments, the RRC system can be used to protect storage volumes within or attached to the system. A storage volume is a logical operating system accessible storage area that hosts a file system. A storage volume may reside on one or more partitions of a physical storage medium, such as a solid-state drive, hard disk drive, flash memory drive, or any other non-volatile, non-transitory storage medium. Additionally, temporary storage volumes may also reside in volatile memory. While protections are described as applying to storage volumes, the concepts described may also be applicable to physical partitions on a storage device. Additionally, some concepts may also be applied at the file system level.

In one embodiment, one or more storage related RRCs could be applied to storage volumes upon attachment to the system, where the storage related RRC causes programmatic access to those volumes to be restricted to applications of the appropriate resource class. For example and in one embodiment, operating system files on a storage volume are restricted such that those files may only be programmatically accessed by an application or process having an appropriate RRC entitlement. Other applications or processes not having an RRC entitlement or having an improper RRC entitlement can be prevented from accessing the files. Although the files are protected from programmatic access, in one embodiment protected files may be browsed via a user interface of the operating system via a properly entitled file system manager if the authenticated user of the system has the appropriate permissions to view the file.

In one embodiment, specific storage volumes are protected by default, including boot volumes storing system startup information or root volumes storing key operating system files. Other volumes such as backup volumes, boot and root volumes for additional operating systems, alternative boot and root volumes for the active operating system, and/or user account home volumes may also be protected according to system policy settings. In one embodiment, generic storage volumes that are not boot, root, home, or backup volumes, but contain files associated with or having the characteristics of those volumes may also be protected. This protection can be applied to physically attached storage volumes on system startup or after system startup when additional volumes are attached via an external interface.

In one embodiment, all storage volumes are protected by default and an additional analysis is performed on the storage volume to determine whether the volume stores or is configured to store system critical information, such as startup information or key operating system files. Additional volumes storing other types of information can be protected based on a policy configured for the system. The additional volumes can include backup volumes, home directory volumes, or boot or root volumes for other bootable operating systems. In one embodiment, storage volumes may be conditionally protected based on the analysis. During the analysis, the storage volume may be browsable by a file manager during the evaluation.

Reference in this specification to "one embodiment" or "an embodiment" indicates that a particular feature, structure, or characteristic described in conjunction with the embodiment can be included in at least one embodiment of the invention. The appearances of the phrase "in one embodiment" in various places in the specification do not necessarily all refer to the same embodiment. Additionally, details described in conjunction with an embodiment may be applied to other embodiments described herein.

Various aspects of the various embodiments will be described with reference to details discussed below. Numerous specific details are described to provide a thorough understanding of various embodiments. However, in certain instances, well-known or conventional details are not described in order to provide a concise discussion of embodiments of the present inventions. The drawings accompanying the description will illustrate the various embodiments described. However, the description and drawings are illustrative of the embodiments and are not to be construed as limiting the invention.

Restricted Resource Classes of an Operating System

The restricted resource class system of the embodiments described herein can be used to designate storage volume resources, as well as various other system resources, as restricted resources. The restricted resources can be categorized into different types or classes. In one embodiment, a resource associated with a particular RRC can only be accessed by software belonging to a particular RRC and that is has RRC entitlements that were authorized by a proper authority. In one embodiment, the RRC entitlements are authorized and signed by a predetermined authority, such as Apple Inc.®, and encoded within an executable image of a software program, such that the RRC entitlements are securely protected and are difficult to modify without detection.

According to one embodiment, an access control list (ACL) can be centrally maintained for the restricted resources by an access control system of an operating system. The ACL can identify some or all of the restricted resources and the respective RRC classes associated with the restricted resources. When an application requests access to a particular resource, the access control system performs a lookup in the ACL based on a resource ID identifying the requested resource to determine whether the requested resource is a part of a restricted resource class. If the requested resource is a restricted resource, the access control system identifies from an entry of the ACL corresponding to the requested resource an RRC identifier. The RRC identifier obtained from the ACL is compared with the RRC identifier retrieved from the executable image of the application. If both RRC identifiers match, it means that the application is entitled to access the requested resource, otherwise the application's request is denied. The application request can be denied even though the application may have the highest the accessing privilege level, such as root or administrative level. Accordingly, even if malware or other malicious software gains access to root or administrative privileges the malware cannot access the protected resource because the malware does not possess the proper RRC entitlements in its executable image.

In an alternate embodiment, in place of a centralized ACL, the restricted class information (e.g., one or more RRC IDs) can be stored in an attribute or metadata associated with each of the restricted resources, for example, in a distributed manner. In one embodiment, when an application requests accessing a particular resource, the access control system examines the metadata or attribute of the requested resource in view of the entitlement of the application to determine whether the application is entitled to access that resource. For example, if the entitlement of the application indicates the application is entitled to access a particular class of resources that matches at least one of the one or more restricted resource classes (represented by one or more RRC IDs) associated with the requested resource, the application is allowed to access the requested resource; otherwise, the request is denied.

FIG. 1 is a block diagram illustrating an access control system 100 of an operating system, according to an embodiment. The access control system 100 can execute on any kind of data processing system, including server, desktop, laptop, tablet, mobile, or handheld data processing systems. In one embodiment the access control system 100 includes security manager 101 for managing security configuration for a variety of clients, including applications (e.g., application 102) executing on the system. The access control system 100 additionally includes an access control manager 103 to manage access of certain resources such as resources 104 of a data processing system.

In one embodiment, the security manager 101 and access control manager 103 are a part of an operating system (OS) executed by processing resources associated with the data processing system executing the access control system 100. An operating system is a collection of software that manages computer hardware resources and provides common services for computer programs. The operating system is an essential component of the system software in a computer system, as application programs typically require some form of an operating system to function. In addition to the security manager 101, the operating system may include other core components, such as a scheduler, a device manager, a kernel, etc. The operating system can be any kind of operating system, including operating systems such as iOS™ from Apple®, Android™ from Google®, Windows™ from Microsoft®, or other operating systems (e.g., UNIX, LINUX, real-time or embedded operating systems).

According to one embodiment, access control manager 103 maintains an access control list (ACL) 105 listing resources that have been categorized as restricted resources. The ACL 105 may be used by access control manager 103 to determine whether a particular resource being accessed is a restricted resource, and if so, whether an application or process attempting to access the resource is entitled to access that particular resource. In one embodiment, the ACL 105 includes multiple entries, each corresponding to one of the restricted resources. Each entry includes a resource identifier (e.g., resource ID 111) uniquely identifying a corresponding resource within the access control system 100 and a restricted resource class identifier (e.g., RRC ID 112) uniquely identifying a class or type of resources in which the corresponding resource is a member. Examples of classes of resources may include a restricted storage volume class, a restricted block device class, etc. Note that some entries may be associated with the same restricted class of resources (e.g., same RRC identifier), while others may be associated with different restricted classes of resources (e.g., different RRC identifiers).

When the access control manager 103 receives a request from an application 102 to access resource 104, based on the request resource, which may be identified by a resource identifier (e.g., name and/or path), the access control manager 103 performs a lookup in the ACL 105 to search for an entry having a resource ID matching the one of requested resource 104. If there no matching entry is found, the requested resource 104 is not a restricted resource, and the application 102 is allowed to access the requested resource 104.

If a matching entry of in the ACL 105 is found, according to one embodiment, the access control manager 103 obtains a first RRC identifier (e.g., RRC ID 112) from the matching entry. The RRC identifier identifies a restricted class of resources to which the requested resource 104 belongs. In addition, the access control manager 103 determines an entitlement 110 of the application 102, which may be encoded within an executable image or binary of the application. The entitlement 110 may be authorized and signed by a predetermined authority, for example, when the application 102 was developed and released to the market or an application store. From the entitlement 110 of the application 102, the access control manager 103 can obtain a second RRC identifier. The access control manager 103 then compares the first and second RRC identifiers. If the first and second RRC identifiers are matched, the application 102 is entitled to access requested resource 104, and the access control manager 103 grants a permission to allow the application 102 to access resource 104.

In the example shown in FIG. 1, it is assumed the application 102 requests to access a particular resource, in this example, a storage volume located at "/Volumes/root." In response to the request, access control manager 103 looks up in ACL 105 based on "/Volumes/root" as a search key to locate an ACL entry having a resource ID matching "/Volumes/root." The access control manager 103 can then obtain an RRC identifier of "restricted system volume," indicating that the "/Volumes/root" storage volume resource is associated with a restricted class of "restricted system volume," which, in this example, indicates that the volume stores critical operating system resources associated with a bootable operating system.

In the example shown, the access control manager 103 obtains an RRC identifier based on the entitlement 110 of the application 102. The access control manager 103 compares the RRC identifier of the application 102 against the RRC identifier "restricted system volume." In this example, assuming the RRC identifier of the application 102 matches "restricted system volume," the access control manager 103 allows the application 102 to access resources stored on "/Volumes/root."

Note that since the RRC identifier of the application 102 is "restricted system volume," the application 102 can also access any other restricted resources listed in the ACL 105 that are associated with a restricted resource class of "restricted system volume." As a result, even if the application 102 is a malware or hijacked by a malware having the highest accessing privilege level (e.g., root or administrative privilege), if the application 102 does not possess the necessary and authenticated RRC identifier, it cannot access the corresponding restricted resource.

In the example show in FIG. 1, different storage volumes may have different RRC identifiers (e.g., RRC ID 112) based on the type of restricted storage volume. For example, a "Volumes/Backups" storage volume used for system backups may have an RRC ID 112 of "restricted backup volume," such that access is restricted to properly credential backup applications. Additionally, specific block devices may be restricted. For example, a resource ID 111 of "/dev/disk2s1" device is shown having an association with an RRC ID 112 of "restricted block device," which can limit the applications able to access any or all volumes stored on the listed block device. However, in one embodiment, restricted storage volumes can be classified generally as "restricted storage" regardless of the volume type, or the type of data stored on the volume, allowing any application with a credential matching "restricted storage" to access the volume and/or data stored thereon.

In the example as shown in FIG. 1, the system centrally maintains the ACL 105 for most or all of the restricted sources. According to another embodiment, the information of ACL 105 may be maintained in a distributed manner. An RRC identifier associated with a restricted resource may be stored in an attribute or metadata associated with the corresponding restricted resource. Accordingly, when the access control manager 103 determines whether a particular resource is a restricted resource and if so, which restricted class associated with the restricted resource, the access control manager 103 can examine the attributes or metadata of the resource instead of a centralized ACL.

Figure 2:
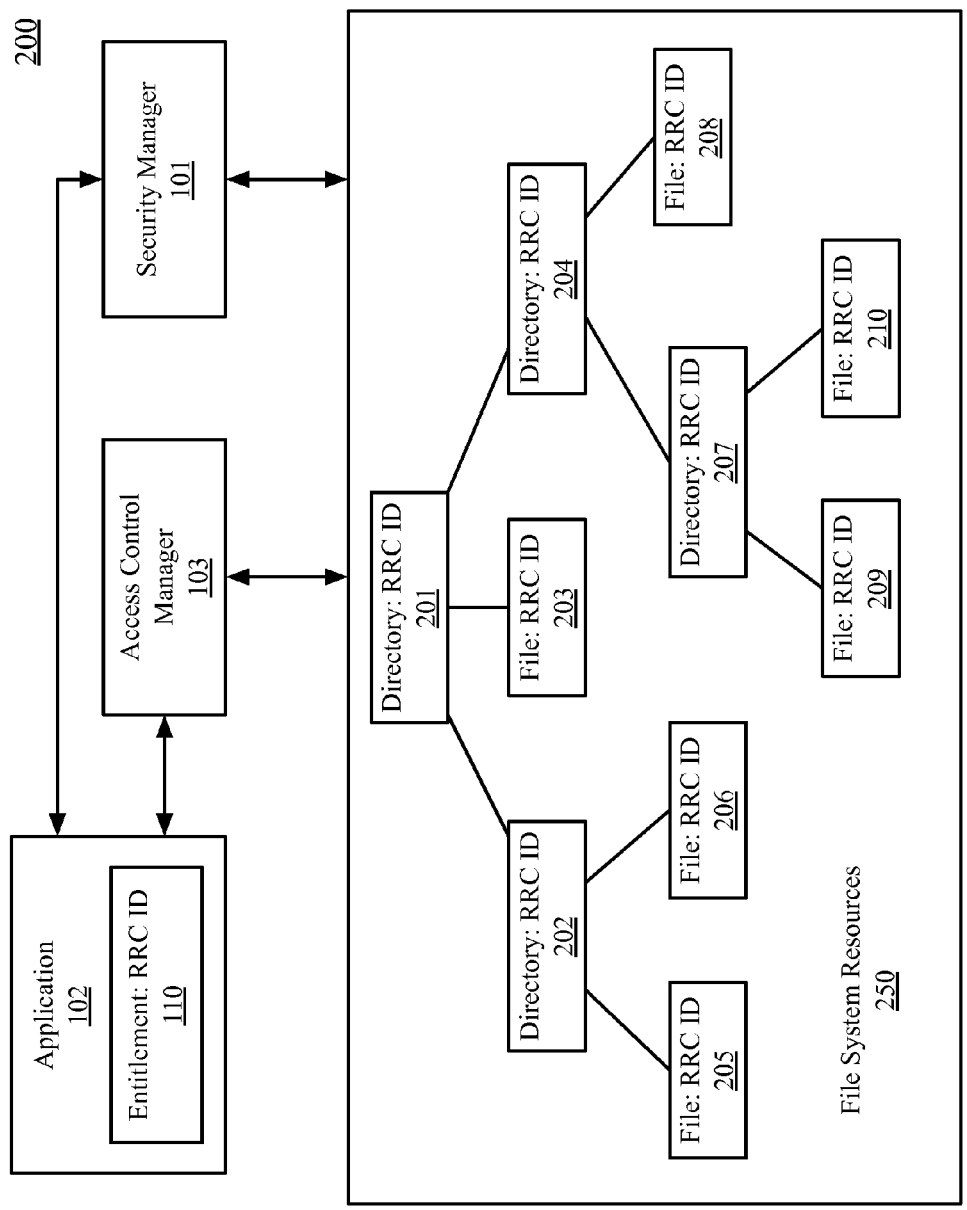
FIG. 2 is a block diagram illustrating an access control system of a data processing system according to another embodiment of the invention.

FIG. 2 is a block diagram illustrating a distributed access control system 200, according to an embodiment. The distributed access control system 200 may be implemented in conjunction with or as an alternative to the access control system 100 of FIG. 1. In the example shown in FIG. 2, it is assumed that the application 102 attempts to access a resource as part of file system resources 250, although the techniques described herein can be applied to other types of resources. In this example, file system resources 250 include resource nodes 201-210, each representing a file or a directory in a hierarchical structure. Each file or directory can have associated attributes or metadata associated with it, such as an inode. An inode is used to represent a file system object, which can be one of various things including a file or a directory. Each inode stores the attributes and disk block location(s) of the file system object's data. File system object attributes may include manipulation metadata (e.g. change, access, modify time), as well as owner and permission data (e.g. group identifier, user identifier, permissions).

In one embodiment, if a file system object, in this example either a file or directory, is categorized as a restricted resource, an attribute or metadata of the file system object includes a list of one or more RRC identifiers identifying one or more classes or types of resources that the file system object belongs. The RRC information may be stored in the regular file system attributes, as part of extended file system attributes, or simply extended file attributes. The extended file attribute is a file system feature that enables users to associate computer files with metadata not interpreted by the file system, whereas regular attributes have a purpose strictly defined by the file system (such as permissions or records of creation and modification times). Extended file attributes can include details such as the author of a document, the character encoding of a plain-text document, a checksum, cryptographic hash or digital signature.

As shown in FIG. 2, some of the file system resource nodes 201-210 may be associated with the same RRC class or different RRC classes. A resource may be associated with multiple classes of resources. The information stored in the attributes of the file system resources 250 can be securely maintained by security manager 101. Any attempt to modify the security settings of these attributes may be vigorously examined and authenticated by security manager, which may require the physical presence of an authenticated user to reduce the probability of malware attack. However, an installer that is part of an operating system may have the privilege to create, modify, or delete certain security settings, as long as the installer is cannot be attacked or compromised. For example, when a new application of a particular user is installed on the system, the installer should be able to create a home directory for the new application and configure any necessary security settings for the new application. Similarly, when a currently installed application is being uninstalled, the installer/uninstaller should be able to remove the corresponding security settings.

In one embodiment, when the access control manager 103 receives a request from an application 102 to access a file system resource, in this example, file object 203, the access control manager 103 examines and retrieves a first RRC identifier from an attribute of file object 203. The access control manager 103 compares the first RRC identifier with a second RRC identifier retrieved from the entitlement 110 of the application 102. If the first and second RRC identifiers match, the access control manager 103 allows the application 102 to access file object 203; otherwise, the request is denied. The RRC identifiers stored in the metadata of the resources are collectively referred to as a distributed ACL. In this embodiment, there is no need to maintain a centralized ACL such as the ACL 105 of FIG. 1, although in certain implementations, both distributed and centralized ACLs may be maintained.

Storage Volume Protection Using Restricted Resource Classes

Figure 3:
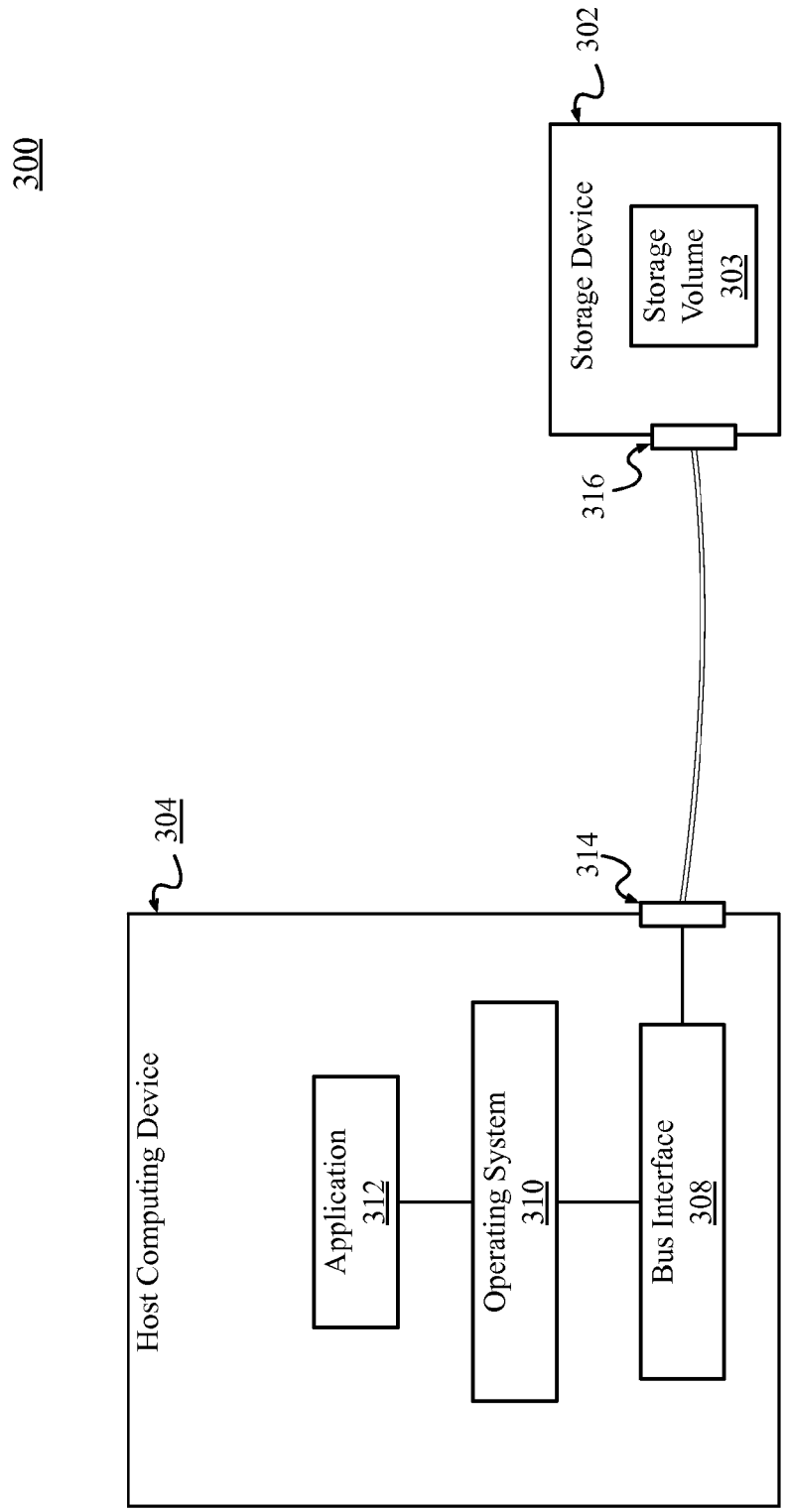
FIG. 3 is a block diagram illustrating an access control system of a data processing system according to another embodiment of the invention.

FIG. 3 is a block diagram illustrating a storage device 302 coupled with a host computing device 304. The storage device 302 can include physical media containing which a storage volume 303. The storage volume 303 can be a logical volume on one or more physical storage devices, on one or more physical partitions of a physical storage device, or a combination thereof. The storage device 302 includes a storage device bus connector 316 that is coupled with a host device bus connector 314 on the host computing device 304. The host device bus connector 314 couples with a bus interface 308, which is logically connected to an operating system 310 executing on the host computing device 304. The operating system 310 can manage the execution of one or more applications (e.g., application 312) executing on the host computing device.

The host device bus connector 314 may couple with the storage device bus connector 316 via a variety of connection mechanisms, including one or more forms of universal serial bus (USB), Thunderbolt®, IEEE 1394, or IEEE 802.3 connectors. While a wired connection is shown, a wireless network connection can also be used to couple to the storage device 302 over the network if the storage device 302 is a network attached storage device. The storage volume 303 can then be attached or "mounted" by the operating system 310 as a network storage volume using any of several network storage mechanism and/or protocols, including but not limited to the apple filing protocol (AFP), server message block (SMB), or network file system (NFS). In one embodiment, user space based file systems, including network user space file systems such as the secure shell file system (SSHFS) are also supported.

In one embodiment, storage volumes attached via an external storage device (e.g., storage device 302) are automatically protected as restricted storage when the storage volume 303 is mounted by a storage management element within operating system 310. A restricted storage class can be assigned to the storage volume 303 based on information available to storage management after the storage device 302 is attached. In one embodiment, storage management within the operating system 310 is handled at the kernel level and the kernel level frameworks and managers used to perform storage management operate at a level of abstraction that may make proper classification of the storage volume difficult.

Figure 4:
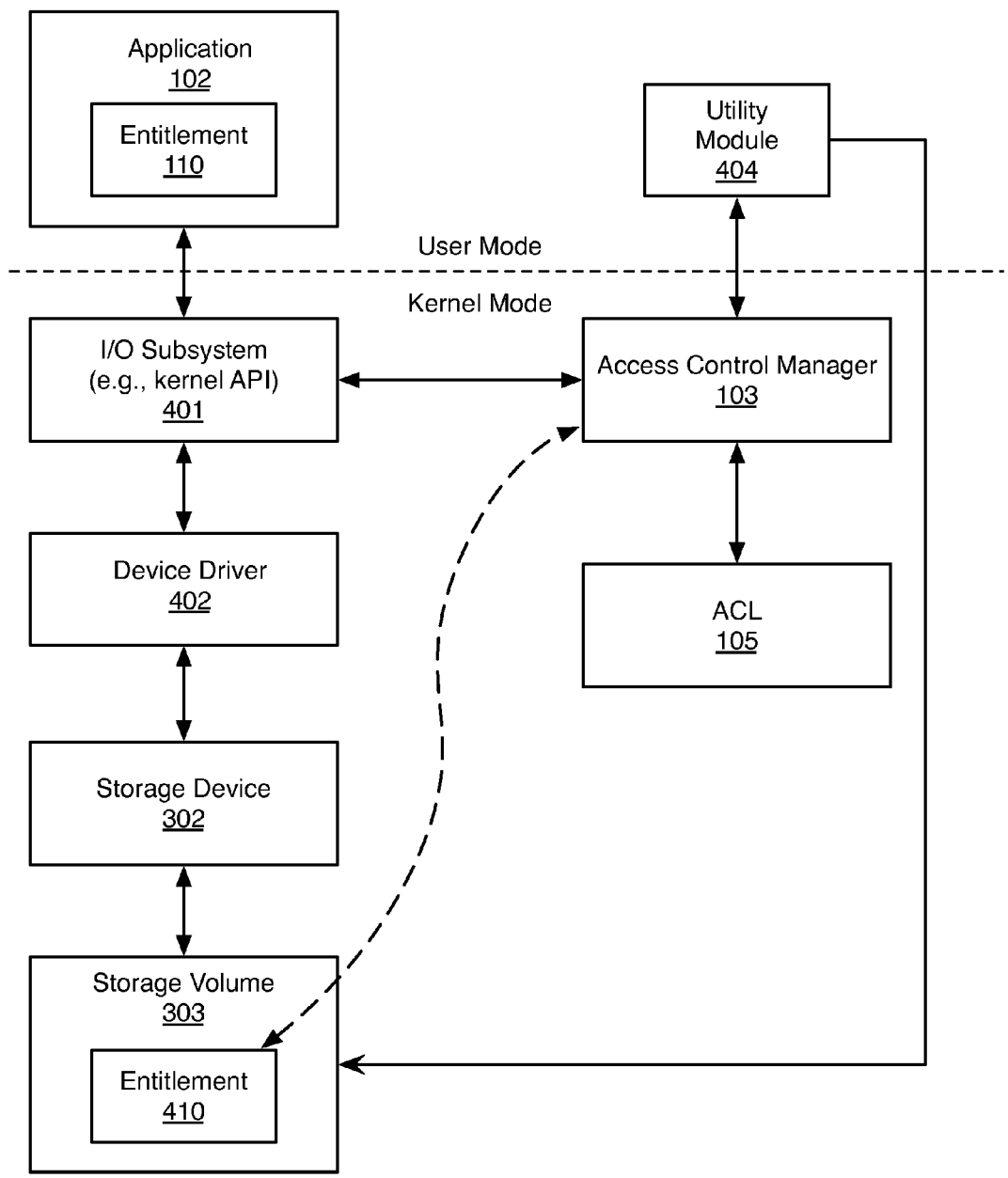
FIG. 4 is a block diagram illustrating an access control system 400 to enable resource classification of attached storage volumes, according to an embodiment.

FIG. 4 is a block diagram illustrating an access control system 400 to enable resource classification of attached storage volumes, according to an embodiment. The access control system 400 may be implemented in conjunction with any of the systems described above. In one embodiment, as shown in FIG. 3, the storage device 302 and included storage volume 303 can attach to the host computing device 304. Upon attachment, an I/O subsystem 401 (e.g., a kernel API) and/or device driver 402 receive a message indicating the attachment of a storage volume. In one embodiment, once the storage volume 303 is logically attached (e.g., mounted), or in conjunction with logically attaching the storage volume 303, the access control manager 103 can create an association between an available restricted resource class and the storage volume. The association can be indicated via an entitlement 410 applied to the storage volume or can be indicated via an entry created in an ACL 105 by the access control manager 103. The association is to limit the degree of programmatic access to the storage volume that is available to an application 102 based on the entitlement 110 of the application.

In one embodiment, a default restricted storage class is initially applied to each storage volume once attached. In such embodiments, automatic protection is applied to attached storage volumes to reduce the attack profile available to any malware, or other malicious software that may be present on the system. For example, if the application 102 were a malware application without an entitlement 110, the storage volume is protected from access as soon as the storage volume becomes available. In one embodiment, although programmatic access is restricted to applications without the proper entitlement, a properly entitled file manager of the operating system will be able to access the storage volume 303 to allow authenticated users of the operating system to browse the storage volume 303 if the user would otherwise have access to the storage volume. For example, if the storage volume 303 contains files without user level access restrictions, or with user level access restrictions matching those of a currently authenticated user of the system, and the application 102 is a file manager having the appropriate entitlement 110 (e.g., restricted storage class, or an entitlement that matches entitlement 410), the user can browse files stores on the storage volume 303 even if the storage volume 303 is restricted.

Although the storage volume 303 may be protected by default, the system may perform an analysis of the storage volume 303 to determine whether the volume should continue to be protected. For example, if the system determines that the storage volume 303 does not contain data that is critical to system function, the restriction on the storage volume may be lifted. In one embodiment, the determination can be made based on whether the storage volume 303 contains data that is critical for either the currently executing operating system or for other bootable operating systems attached to or available to the system. In one embodiment, a determination is made as to whether the storage volume 303 includes backup data associated with an operating system.

In one embodiment, this determination is a policy-based determination that is made based on a security policy configured for the system. According to security policy, storage volumes 303 storing home directory data for one or more users on the system can also be protected. In such embodiment, also according to security policy, default protection can be enabled only for certain volumes, such as a boot volume or root volume of the system, and protection is applied to other volumes based on an evaluation of the volume after attachment. In such embodiment, an evaluation can be performed to determine whether the storage volume 303 includes data associated with a restricted storage class or type, or includes metadata indicating that the volumes is configured to store data associated with a restricted class or storage type. Alternatively, where all attached volumes are protected by default, an evaluation can be performed to determine whether the storage volume does not contain data or metadata associated with one of the explicitly defined restricted storage classes or types on the system.

In one embodiment, storage management within the operating system 310 is handled at the kernel level and the kernel level frameworks and managers used to perform storage management operate at a level of abstraction that may make proper classification of the storage volume difficult. In such embodiment, the access control manager 103 is a kernel component of the operating system. The access control manager 103 can send a request to a utility module 404, which is a user space component of the operating system, to perform an evaluation of the storage volume 303 to determine whether the storage volume 303 should continue to be protected as a restricted storage class.

The evaluation can be performed based on data stored on the storage volume 303 or metadata associated with the storage volume. In one embodiment, the evaluation can be performed based on data associated with the physical partitions of the storage device on which the storage volume 303 resides. In one embodiment, the evaluation can be performed based on the layout or directory structure of the storage volume 303. For example, where the system includes a backup program that stores backup data in a predefined layout, the utility module 404 can recognize data stored in such layout on the storage volume 303 and flag the volume as storing backup data. In one embodiment, the evaluation is performed each time a volume is attached or mounted by the system and no information is retained for a volume once the volume is detached or unmounted.

In one embodiment, where the result of the utility module 404 evaluation indicates that the storage volume does not contain data or metadata associated with one of the restricted storage classes or types, the utility module 404 can indicate to the access control manager 103 that the storage volume 303 is not associated with a restricted resource class or type. In response to such indication, the access control manager 103 can remove the association with the restricted resource class from the storage volume 303. Removing the association can include removing an entitlement 410 associated with the storage volume 303, or removing an entry in the ACL 105 associating the storage volume 303 with the restricted resource class. In one embodiment, where the utility module 404 determines that the storage volume 303 is associated with a restricted resource class, the entitlement 410 or entry in the ACL 105 can remain. In one embodiment, where more explicit restricted storage classes are defined (e.g., restricted system volume, restricted backup volume), the access control manager 103 can amend the entitlement 410 or entry to be reflective of the more explicit restricted storage class.

Figure 5:
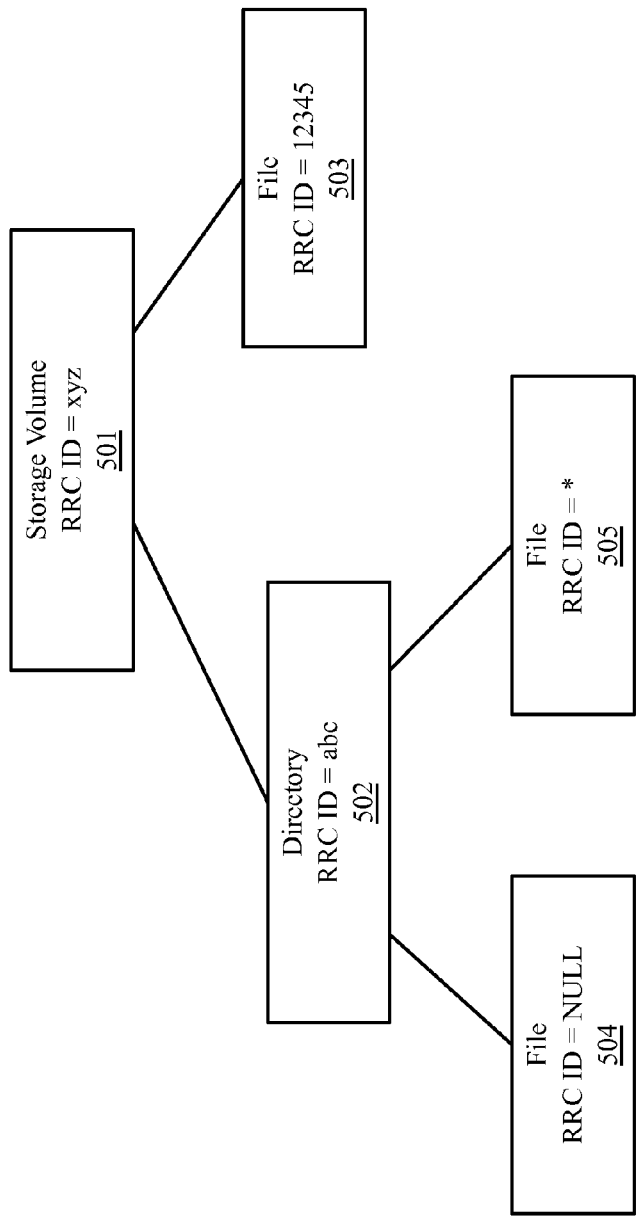
FIG. 5 is a block diagram illustrating an additional access control system of an operating system, according to an embodiment.

FIG. 5 is a block diagram illustrating an additional access control system of an operating system, according to an embodiment. In one embodiment, resources that would not otherwise be restricted may be considered restricted based on a relationship with a restricted resource. For example, resources 301-305 shown in FIG. 5 have stored in their respective metadata or attributes RRC identifiers "xyz," "abc," "12345," "NULL," and "*," respectively, which will be described in details further below.

In one embodiment, when the access control manager (e.g., access control manager 103 of FIG. 2) examines security settings of a particular resource, the access control manager may traverse the hierarchical tree 500 (which may be part of file system resources 250 of FIG. 2) in a bottom up approach. Generally, access to resources without a specified RRC ID (e.g., RRC identifier is NULL) is not restricted at the restricted resource class level, although other, higher level access privileges may be in place. For example, when an application requests to access a resource (e.g., file resource 504) without an RRC identifier specified as a resource attribute, typically it means that access to the resource is unrestricted.

However, in one embodiment, because the file resource 504 is a child resource of another resource (e.g., directory resource 502 as a parent resource), certain security settings of one or more parents may be inherited. In such embodiment, the access control manager can traverse the tree to examine the parent resources to determine whether any parent resource is a restricted resource. Since file resource 504 has directory resource 502 as a parent, and the directory resource 502 is a restricted resource that requires an RRC identifier of "abc," file resource 504, as a child resource of directory resource 502, inherits the same security settings as the directory resource 502. Accordingly, only applications having an RRC identifier of abc can access file resource 504.

According to another embodiment, in some situations, although a particular resource is a child resource of another parent resource, one can specify in its attribute an exception to the security settings of its parent resource(s). For example, file resource 505 is a child if directory resource 502. However, in this example, file resource 505 has an RRC identifier as a predetermined token, value, a string of characters, or a combination thereof, such as "*." For the purpose of illustration, such an RRC identifier of "*" indicates that the file resource 505 does not inherit the security settings from its parent, directory resource 502. Instead, security settings other than the parent's security settings are used, including specifying one or more applications that may access the file resource 505 as an exception.

The processes, methods and/or operations depicted in FIGS. 6-8 below may be performed by processing logic that comprises hardware (e.g. circuitry, dedicated logic, etc.), firmware, software (e.g., embodied on a non-transitory computer readable medium), or a combination of both. Various embodiments provide a data processing system comprising processing logic that includes one or more processors that are configured to execute software stored on a non-transitory machine-readable medium within or attached to the device.

Additionally logic to perform the illustrated operations can be embodied in hardware or firmware of a computing system or as part of storage device or storage processing logic. Although the processes or methods are described in terms of sequential operations, it should be appreciated that some of the operations described may be performed in a different order. Moreover, some operations may be performed in parallel rather than sequentially.

Figure 6:
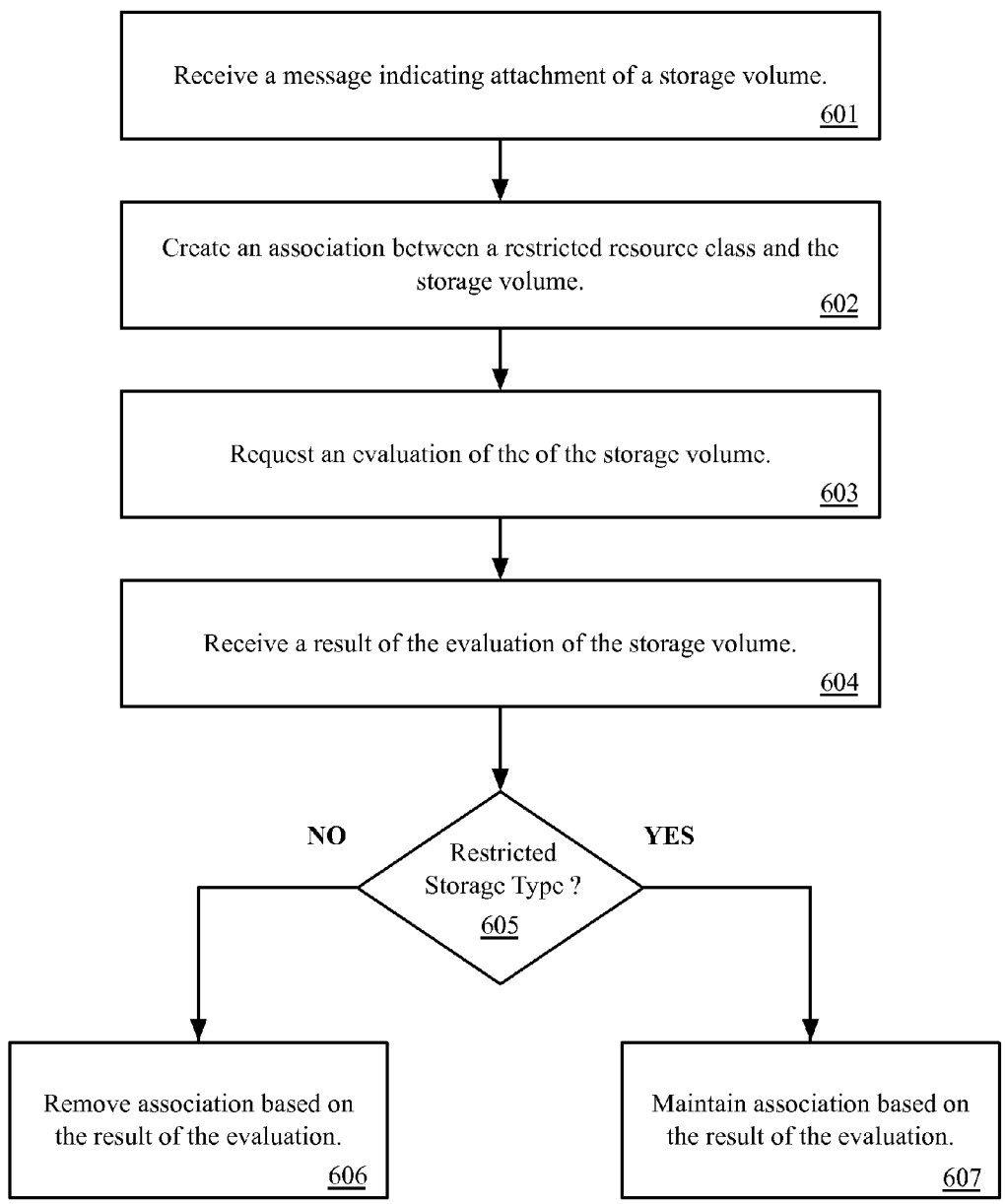
FIG. 6 is a flow diagram illustrating logic to protect a storage volume using a restricted resource class, according to one embodiment.

FIG. 6 is a flow diagram illustrating logic 600 to protect a storage volume using a restricted resource class, according to one embodiment. In one embodiment, the logic operations are performed by one or more processors based on instructions provided by an access control manager, such as the access control manager 103 shown in FIGS. 1, 2, and 4. Some logic operations can be performed in conjunction or cooperation with the utility module 404 and I/O subsystem 401 shown in FIG. 4.

In one embodiment, the operations include to receive a message indicating attachment of a storage volume, as shown at block 601. The logic 600 can further create an association between a restricted resource class and the storage volume. The association can be created based on any of the techniques described above, including a central access control list, in which an entry the access control list is created, or a distributed access control list, in which metadata is attached to the storage volume. Each technique, or an equivalent technique, can result the creation of the association, which causes the restricted resource class system to limit programmatic access to the storage volume to applications having the appropriate credentials.

In one embodiment, the association of block 602 is created by default for all attached storage volumes and is explicitly maintained for storage volumes including system root volumes, system boot volumes, alternate boot and root volumes for other bootable operating systems (e.g., dual boot systems), and system backup volumes. In one embodiment, the association is explicitly maintained for other volumes, such as volumes storing user home directory data, based on a security policy configured on the system. For volumes not in the list of restricted storage volumes, the default restrictions may be released.

In one embodiment, the logic 600 includes requesting an evaluation of the storage volume at block 603 to determine the type of storage volume and/or the data or type of data stored on the storage volume. In one embodiment the logic 600 associated with blocks 601-603 is performed by or at the request of kernel mode software of an operating system. In such embodiment, due to information layering and data abstraction, the software in the kernel may not have detailed information as to the contents of the storage volume at the file system layer. Accordingly, the request for the evaluation at block 603 can be made to a user mode utility that operates at a data abstraction layer from which the relevant information for the evaluation can be determined. In response to the request at block 603, the user mode utility can evaluate the storage volume based on metadata, data, or the layout of data on the storage volume to determine if the storage volume stores data of a restricted type. The result of the evaluation can be returned to the kernel mode component, which can receive the result of the evaluation of the storage volume at block 604. Based on whether the storage volume is determined to be a restricted storage type as reflected at block 605, the logic 600 can remove the association at block 606, or maintain the association at block 607. For example, if the storage type is a restricted storage type at block 605 (e.g., YES), the logic 600 can maintain the association, as shown at block 607. If the storage type is not a restricted storage type at block 605 (e.g., NO), the logic can remove the association, as shown at block 606.

While the logic 600 of FIG. 6 is illustrated as creating an association between the restricted resource class and the storage volume at block 602 prior to requesting an evaluation of the storage volume, such that attached storage volumes are protected by default. However, in one embodiment, at least some storage volumes are not protected by default, such that an evaluation is performed on the storage volume before data protection is applied. In such embodiment, the logic 600 will receive a message indicating attachment of a storage volume, then request an evaluation of the storage volume in response to the receiving the message. Based on the result of the evaluation, the logic 600 can create an association between a restricted resource class and the storage volume to limit programmatic access to the storage volume. During the evaluation the storage volume is browsable via a file manager of the system, although in one embodiment access to the storage volume during the evaluation may be restricted to system applications having the appropriate entitlements to access restricted resources.

Figure 7:
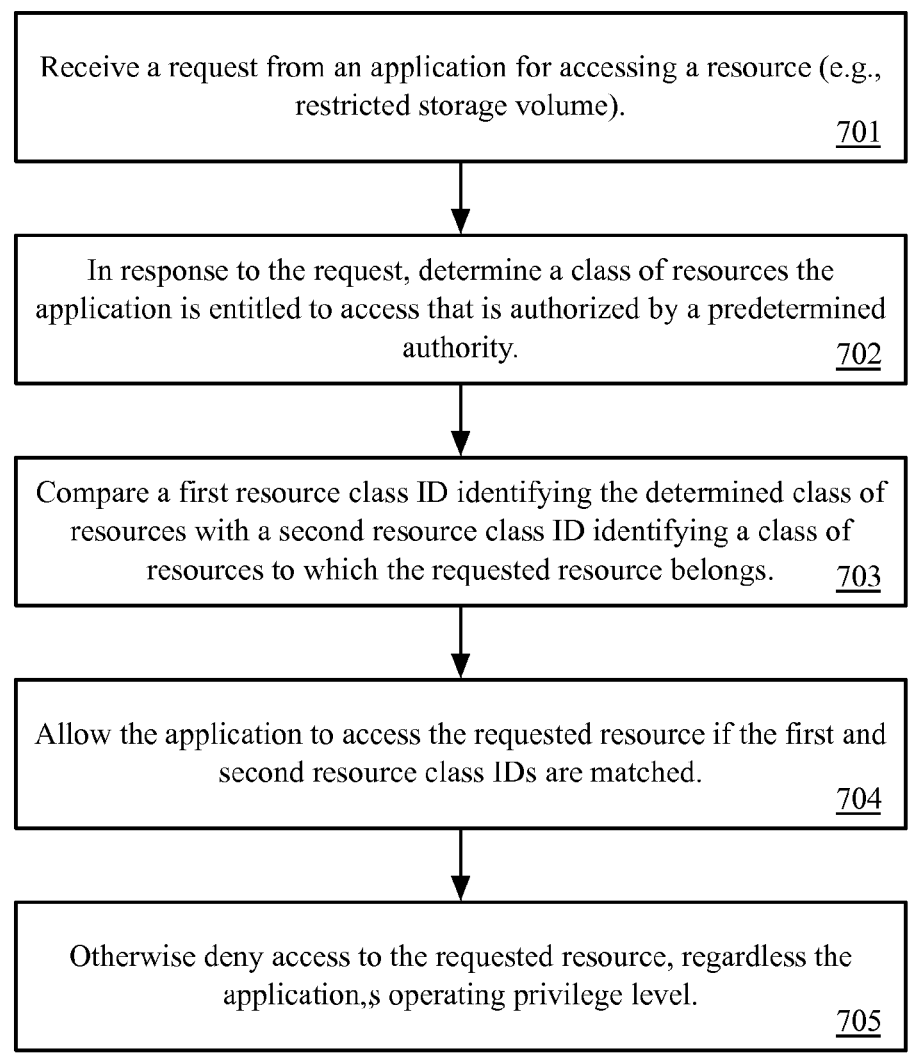
FIG. 7 is a flow diagram illustrating logic to control access to a restricted storage volume, according to one embodiment.

FIG. 7 is a flow diagram illustrating logic 700 to control access to a restricted storage volume, according to one embodiment. In one embodiment, the logic 700 can receive a request from an application to access a resource (e.g., a file or directory of a file system stored in a restricted storage volume), as shown at block 701. In response to the request, at block 702, the logic 700 can determine a class or type of resources to which the application is entitled access, which is authorized (and signed) by a predetermined authority. At block 703, processing logic can compare a first resource class identifier identifying the determined class of resources with a second resource class identifier identifying a class of resources to which the requested resource belongs. At block 704, if the first and second resource class identifiers can be matched and the application is allowed to access the requested resource. Otherwise (e.g., by default) at block 705 the logic 700 can deny access to the requested resource. This request can be denied regardless of the application's operating privilege level, which means an application having root or supervisor privilege is denied access to the resource if the first and second resource class IDs are not matched at block 704.

Figure 8:
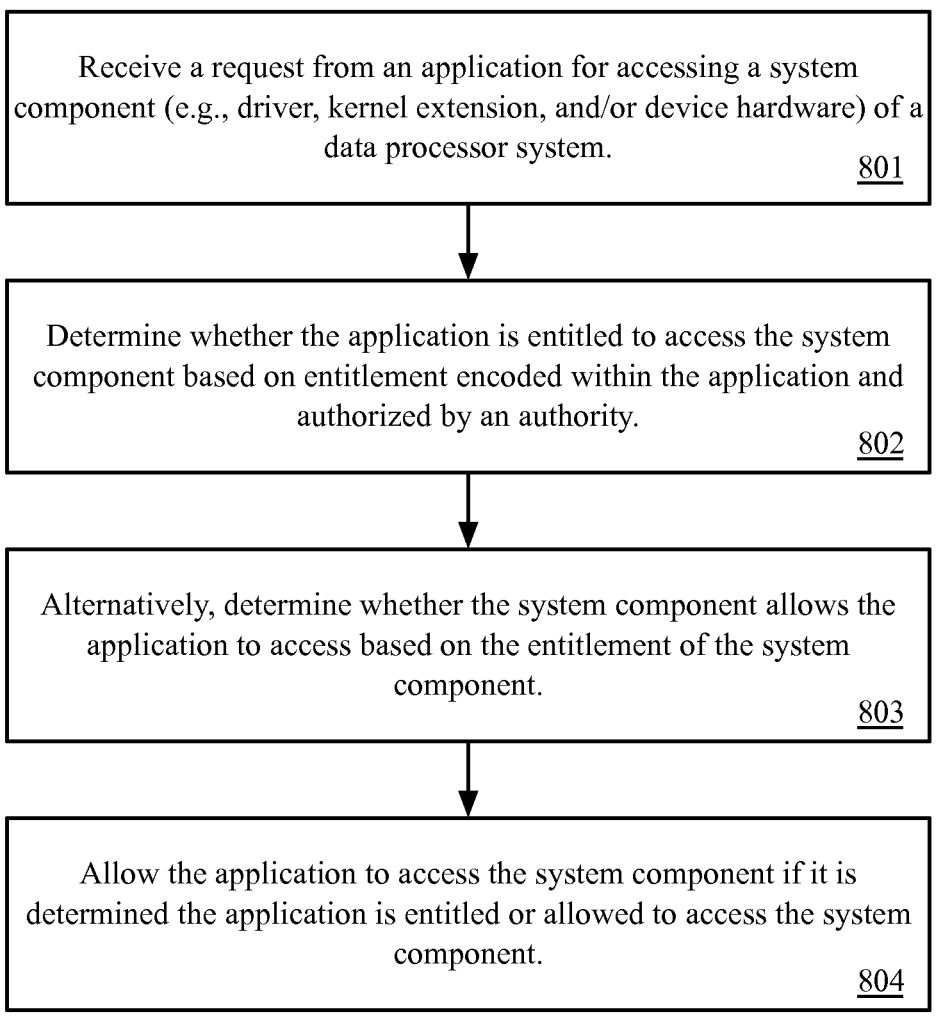
FIG. 8 is a flow diagram illustrating a method for access control of an operating system according to another embodiment of the invention.

FIG. 8 is a flow diagram illustrating a method 800 for access control of an operating system according to another embodiment of the invention. The method 800 may be performed by processing logic, which may include software, hardware, or a combination thereof. At block 801, processing logic can receive a request from an application to access a system component (e.g., kernel component or kernel extension, device driver, and/or hardware device) of a data processing system. In response to the request, at block 802, processing logic can determine whether the application is entitled to access the requested system component based on the entitlement of the application or alternatively, processing logic determines whether the system component specifically allows the application for access at block 803. If it is determined the application is entitled or allowed to access the system component, at block 804, permission is granted to the request; otherwise, the request is denied.

According to some embodiment, the security settings concerning the restricted classes of resources may be securely managed and only an authorized process can be allowed to create, modify, and/or delete security settings. In order to avoid a malware having certain system access privileges (e.g., root, administrative) to modify the security settings, a security manager (e.g., security manager 101 of FIG. 1) can provide an indication and/or proof that a request for modifying a security settings is initiated from a physical user interaction with the device. The security system of a data processing system may cause a user to perform a physical act that only a human can do that before allowing the security settings to be modified.

Figure 9:
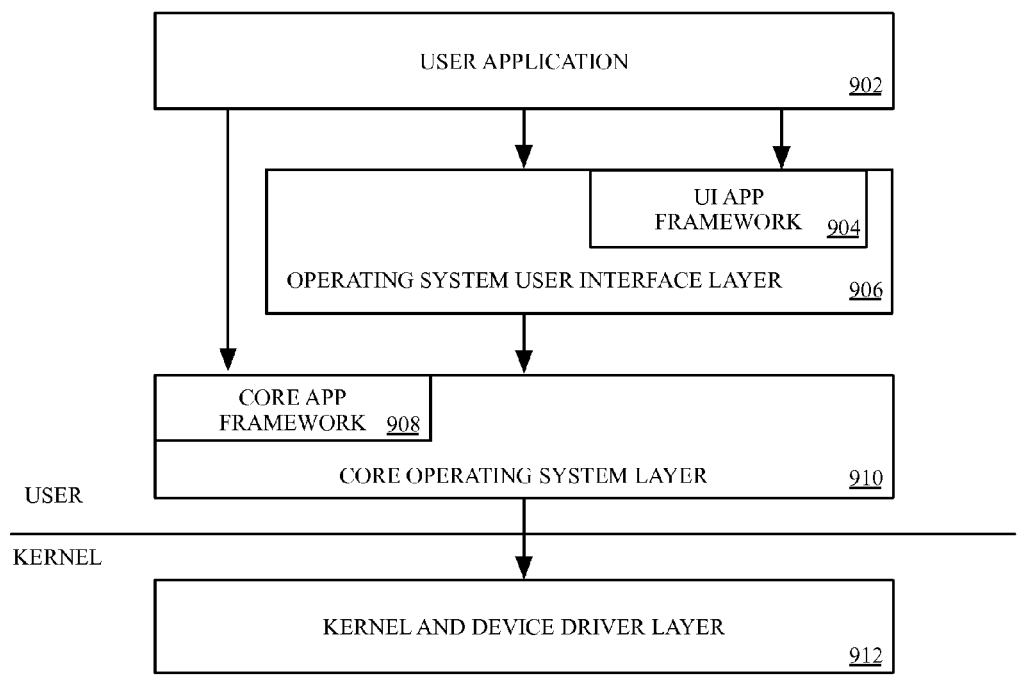
FIG. 9 is a block diagram illustrating a multi-layer software architecture used by a data processing system, according to an embodiment.

FIG. 9 is a block diagram illustrating a multi-layer software architecture 900 used by a data processing system, according to an embodiment. The software components are illustrated with a division between user space and a kernel space. Although other arrangements are possible, user applications (e.g., user application 902), and some operating system components (e.g., operating system user interface layer 906, and the core operating system layer 910) execute in user space. In kernel space, the operating system kernel and a set of device drivers operate in the kernel and device driver layer 912. The kernel and device driver layer 912 manage the underlying functionality of the overall operating system and provide a formalized and secure mechanism for user space software to access data processing system hardware.

A user interface (UI) application framework 904 provides a mechanism for the user application 902 to access UI services provided by the operating system UI layer 906. Underlying operating system functions that are not related to the user interface can be performed in the core operating system layer 910. One or more data management frameworks, such as a core app framework 908 can be made available to a user application to facilitate access to operating system functions.

The user application 902 may be any one of a plurality of user applications. Each user application 902 can include one or more processes or tasks, which may spawn multiple threads. The user application 902 can access instructions in an UI app framework 904 for creating and drawing graphical user interface objects such as icons, buttons, windows, dialogs, controls, menus, and other user interface elements. The UI application framework 904 also provides additional functionality including menu management, window management, and document management, as well as file open and save dialogs, drag-and-drop, and copy-and-paste handling.

The core operating system layer 910 contains operating system components that implement features including and related to application security, system configuration, graphics and media hardware acceleration, and directory services. Multiple application frameworks, including the core app framework 908, provide a set of APIs to enable a user application 902 to access core services that are essential to the application, but are not directly related to the user interface of the application. The core app framework 908 can facilitate an application's access to database services, credential and security services, backup services, data synchronization services, and other underlying functionality that may be useful to an application.

The core app framework 908, or equivalent application frameworks, can provide access to remote server based storage for functionality including synchronized document storage, key-value storage, and database services. Key-value storage allows a user application 902 to share small amounts of data such as user preferences or bookmarks among multiple instances of the user application 902 across multiple client devices. The user application 902 can also access server-based, multi-device database solutions via the core app framework 908.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 10:
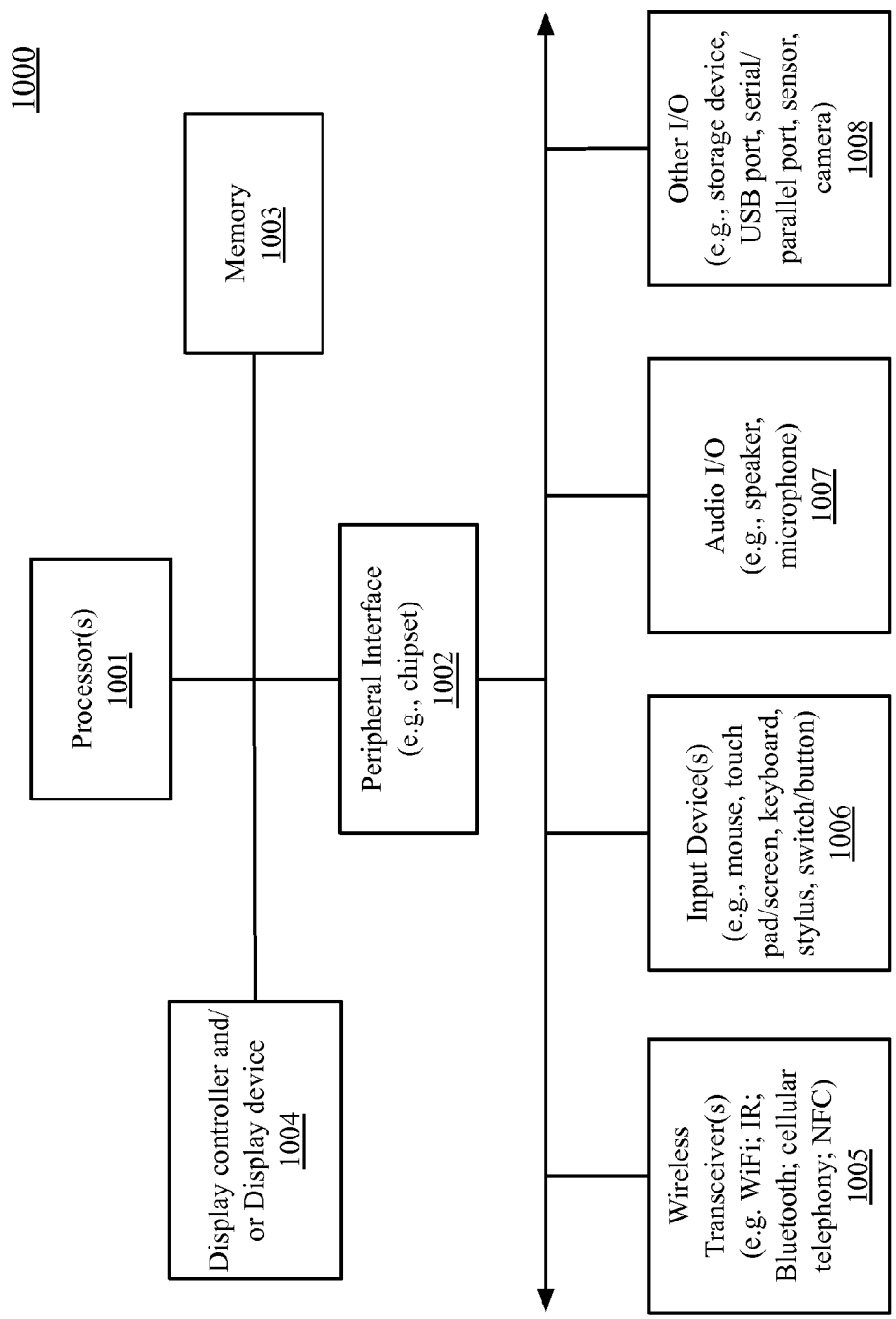
FIG. 10 is a block diagram illustrating an exemplary data processing system, according to an embodiment.

FIG. 10 is a block diagram illustrating an exemplary data processing system 1000, according to an embodiment. The data processing system 1000 can represent any of the data processing systems described above. For example, system 1000 may represent a desktop (e.g., iMac® available from Apple Inc. of Cupertino, Calif.), a laptop (e.g., MacBook®), a tablet (e.g., iPad® a server, a mobile phone (e.g., iPhone®), a media player (e.g., iPod® or iPod Touch®), a personal digital assistant (PDA), a personal communicator, a gaming device, a network router or hub, a wireless access point (AP) or repeater, a set-top box, or a combination thereof.

In one embodiment, data processing system 1000 includes one or more processor(s) 1001 and peripheral interface 1002, also referred to herein as a chipset, to couple various components to processor(s) 1001 including memory 1003 and devices 1005-1008 via a bus or an interconnect. Processor(s) 1001 may represent a single processor or multiple processors with a single processor core or multiple processor cores included therein. Processor(s) 1001 may represent one or more general-purpose processors such as a microprocessor, a central processing unit (CPU), or the like. More particularly, processor(s) 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor(s) 1001 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions.

Peripheral interface 1002 can include a memory control hub (MCH) and input output control hub (ICH). Peripheral interface 1002 may include a memory controller (not shown) that communicates with memory 1003. Peripheral interface 1002 can also include a graphics interface that communicates with graphics subsystem, which may include a display controller and/or a display device 1004. Peripheral interface 1002 can communicate with graphics device coupled to a display controller and/or display device 1004 via a peripheral component interconnect (PCI) express bus or other types of interconnect mechanisms.

Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor(s) 1001, or any other device. For example, executable code and/or data of a variety of operating systems, device drivers, firmware (e.g., input output basic system or BIOS), and/or applications can be loaded in memory 1003 and executed by processor(s) 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1002 may provide an interface to IO devices such as devices 1005-1008, including wireless transceiver(s) 1005, input device(s) 1006, audio IO device(s) 1007, and other I/O devices 1008. The wireless transceiver(s) 1005 may be one or more of a WiFi transceiver, an infrared transceiver, a Bluetooth transceiver, a near field communication (NFC) transceiver, a wireless cellular telephony transceiver, a satellite transceiver (e.g., a global positioning system (GPS) transceiver) or a combination thereof. Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, an input device can include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio I/O 1007 may include a speaker and/or a microphone to facilitate voice-enabled functions, such as voice recognition, voice replication, digital recording, and/or telephony functions. Other I/O devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. The other I/O devices 1008 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 10 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems that have fewer components, or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of protecting a storage volume using a restricted resource class, the method comprising:
   receiving a message indicating attachment of a storage volume;
   creating an association between a restricted resource class (RRC) and the storage volume to limit programmatic access to the storage volume to one or more programs having an RRC entitlement to access resources in the RRC;
   requesting an evaluation of the storage volume;
   receiving a result of the evaluation of the storage volume;
   removing or maintaining the association based on the result;
   in response to the result of the evaluation indicating that the storage volume is a protected storage volume:
      receiving one or more RRC entitlements from a program that requests programmatic access to the storage volume, wherein an RRC entitlement indicates that the program is entitled to access a resource in the restricted resource class;
      allowing the program to access data on the storage volume in response to an RRC entitlement of the program matching the RRC associated with the storage volume.

2. The method as in claim 1, wherein creating the association between the restricted resource class and the storage volume includes associating a resource identifier for the storage volume with a restricted resource class identifier and associating the resource identifier for the storage volume with a restricted resource class identifier includes creating an entry in an access control list to identify one or more restricted resource classes associated with the storage volume.

3. The method as in claim 1, wherein the restricted resource class is to
   limit programmatic access to the storage volume to a set of applications having a matching restricted resource class.

4. The method as in claim 1, wherein the message indicating attachment of the storage volume is received by a kernel component of an operating system executed via one or more processors and requesting an evaluation of the storage volume includes sending a message from the kernel component to a user space component of the operating system, the message requesting the evaluation of the storage volume.

5. The method as in claim 4, wherein the evaluation of the storage volume includes analyzing data stored on the storage volume to determine if the data is of a type of data associated with the restricted resource class.

6. The method as in claim 4, wherein the evaluation of the storage volume includes analyzing metadata associated with the storage volume to determine if the storage volume is to store a type of data associated with the restricted resource class.

7. The method of claim 1, wherein the one or more RRC entitlements of the program are stored in an executable image of the program.

8. The method of claim 1, further comprising:
   allowing the program to access data of any resource having the same RRC as the storage volume, in response to an RRC entitlement of the program matching the RRC of the storage volume.

9. A non-transitory machine-readable medium storing instructions which, when executed by one or more processors, cause the one or more processors to perform operations comprising:
   receiving a message indicating attachment of a storage volume;
   creating an association between a restricted resource class (RRC) and the storage volume to limit programmatic access to the storage volume to one or more programs having an RRC entitlement to access resources in the RRC;
   requesting an evaluation of the of the storage volume;
   receiving a result of the evaluation of the storage volume;
   removing or maintaining the association based on the result;
   in response to the result of the evaluation indicating that the storage volume is a protected storage volume:
      receiving one or more RRC entitlements from a program that requests programmatic access to the storage volume, wherein the RRC entitlement indicates that the program is entitled to access a resource in the restricted resource class;
      allowing the program to access data on the storage volume in response to determining that an RRC entitlement of the program matches the RRC associated with the storage volume.

10. The medium as in claim 9, wherein creating the association between the restricted resource class and the storage volume includes associating a resource identifier for the storage volume with a restricted resource class identifier.

11. The medium as in claim 10, wherein associating the resource identifier for the storage volume with a restricted resource class identifier includes creating an entry in an access control list to identify one or more restricted resource classes associated with the storage volume.

12. The medium as in claim 9, wherein the restricted resource class limits programmatic access to the storage volume to a set of applications having a matching restricted resource class.

13. The medium as in claim 9, wherein the message indicating attachment of the storage volume is received by a kernel component of an operating system executed via the one or more processors.

14. The medium as in claim 13, wherein requesting an evaluation of the storage volume includes sending a message from the kernel component to a user space component of the operating system, the message requesting the evaluation of the storage volume.

15. The medium as in claim 14, wherein the evaluation of the storage volume includes analyzing data stored on the storage volume to determine if the data is of a type of data associated with the restricted resource class.

16. The medium as in claim 14, wherein the evaluation of the storage volume includes analyzing metadata associated with the storage volume to determine if the storage volume is to store a type of data associated with the restricted resource class.

17. A data processing system comprising one or more processors,
including at least one hardware processor, coupled to memory, the one or more processors to execute a plurality of processes comprising:
a kernel mode process to receive a message indicating attachment of a storage volume and create an association between a restricted resource class (RRC) and the storage volume to limit programmatic access to the storage volume to one or more programs having an RRC entitlement to access resources in the RRC; and
a user mode process to perform an evaluation of the storage volume upon request from the kernel mode process, the evaluation based on one or more characteristics of the storage volume, wherein the kernel mode process is to maintain the association between the restricted resource class and the storage volume, in response a result of the evaluation indicating that the storage volume is a protected volume;
the kernel mode process further configured to receive one or more RRC entitlements from a program that requests programmatic access to the storage volume, wherein an RRC entitlement indicates that the program is entitled to access a resource in the restricted resource class, and configured to allow access to data on the storage volume in response to the kernel mode process determining that an RRC entitlement of the program matches the RRC associated with the storage volume.

18. The system as in claim 17, wherein the characteristics of the storage volume include a type of data stored on the storage volume, metadata associated with the storage volume, and data stored on the storage volume.

19. The system as in claim 18, wherein the type of data stored on the storage volume includes backup data or operating system data and the data stored on the storage volume is to indicate that the storage volume is a user home directory, bootable operating system, or a backup volume.

20. The system as in claim 18, wherein the metadata associated with the storage volume is to indicate that the storage volume is a user home directory, that the storage volume contains a bootable operating system, or that the storage volume is a backup volume.

21. The system as in claim 17, wherein the characteristics of the storage volume include layout of data on the storage volume and wherein the layout of data on the storage volume is to indicate that the storage volume is a backup volume or a user home directory.

22. The system as in claim 17, wherein the kernel mode process is to associate a resource identifier for the storage volume with a restricted class identifier to create the association between the restricted resource class and the storage volume.

23. The system as in claim 22, wherein the kernel mode process is further to create an entry in an access control list to associate the resource identifier for the storage volume with the restricted class identifier.

24. The system as in claim 23, wherein the user mode process is further to transmit a result of the evaluation to the kernel mode process.

25. The system as in claim 24, wherein the kernel mode process is further to remove or maintain the association based on the result of the evaluation.

26. The system as in claim 17, wherein the storage volume resides at least in part on a physically coupled storage device.

27. The system as in claim 26, wherein the storage volume is a logical volume associated with one or more physically coupled storage volumes.

28. The system as in claim 17, wherein the storage volume resides at least in part on a storage volume coupled via a network.

29. The system as in claim 17, wherein the storage volume is browsable via a file manager during the evaluation of the storage volume.

30. A method of protecting a storage volume using a restricted resource class, the method comprising:
receiving a message indicating attachment of a storage volume;
requesting an evaluation of the of the storage volume;
receiving a result of the evaluation of the storage volume; and
based on the result of the evaluation, creating an association between a restricted resource class (RRC) and the storage volume to limit programmatic access to the storage volume to one or more programs having an RRC entitlement to access resources in the RRC, wherein the storage volume is browsable via a file manager during the evaluation of the storage volume;
in response to the result of the evaluation indicating that the storage volume is a protected volume:
receiving one or more RRC entitlements from a program that requests programmatic access to the storage volume, wherein an RRC entitlement indicates that the program is entitled to access a resource in the restricted resource class;
allowing the program to access data on the storage volume in response to an RRC entitlement of the program matching the RRC associated with the storage volume.

31. The method as in claim 30, wherein creating the association between the restricted resource class and the storage volume includes associating a resource identifier for the storage volume with a restricted resource class identifier.

32. The method as in claim 31, wherein associating the resource identifier for the storage volume with a restricted resource class identifier includes creating an entry in an access control list to identify one or more restricted resource classes associated with a the storage volume.

* * * * *